United States Patent
Zhang et al.

(10) Patent No.: US 10,649,996 B2
(45) Date of Patent: May 12, 2020

(54) DYNAMIC COMPUTATION NODE GROUPING WITH COST BASED OPTIMIZATION FOR MASSIVELY PARALLEL PROCESSING

(71) Applicant: Futurewei Technologies, Inc., Plano, TX (US)

(72) Inventors: Li Zhang, San Jose, CA (US); Jason Yang Sun, Palo Alto, CA (US); Yonghua Ding, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 548 days.

(21) Appl. No.: 15/374,158

(22) Filed: Dec. 9, 2016

(65) Prior Publication Data

US 2018/0165331 A1 Jun. 14, 2018

(51) Int. Cl.
    G06F 17/00 (2019.01)
    G06F 16/2453 (2019.01)
    G06F 16/22 (2019.01)
    G06F 16/2455 (2019.01)

(52) U.S. Cl.
    CPC .... *G06F 16/24544* (2019.01); *G06F 16/2255* (2019.01); *G06F 16/24532* (2019.01); *G06F 16/24542* (2019.01); *G06F 16/24545* (2019.01); *G06F 16/24554* (2019.01)

(58) Field of Classification Search
    CPC ......... G06F 16/24544; G06F 16/24542; G06F 16/24532; G06F 16/24554; G06F 16/24545; G06F 16/2255
    See application file for complete search history.

(56) References Cited

U.S. PATENT DOCUMENTS

| | | | | |
|---|---|---|---|---|
| 6,092,062 | A  * | 7/2000 | Lohman | G06F 16/24542 |
| 8,799,284 | B2 * | 8/2014 | Jagtiani | G06F 16/24532 |
| | | | | 707/736 |
| 9,152,669 | B2 * | 10/2015 | Singamshetty | G06F 1/035 |
| 9,576,026 | B2 * | 2/2017 | Singamshetty | G06F 16/24532 |
| 9,953,057 | B2 * | 4/2018 | Dickie | G06F 16/2456 |
| 2012/0209943 | A1 | 8/2012 | Jung | |

(Continued)

FOREIGN PATENT DOCUMENTS

CN 103488778 A 1/2014

OTHER PUBLICATIONS

PCT/CN2017/111395, ISR, Feb. 22, 2018.

*Primary Examiner* — Greta L Robinson
(74) *Attorney, Agent, or Firm* — Vierra Magen Marcus LLP

(57) ABSTRACT

A massively parallel processing shared nothing relational database management system includes a plurality of storages assigned to a plurality of compute nodes. The system comprises a non-transitory memory having instructions and one or more processors in communication with the memory. The one or more processors execute the instructions to store a set of data in a first set of storages in the plurality of storages. The first set of data is hashed into a repartitioned set of data. The first set of storages is reassigned to a second set of compute nodes in the plurality of compute nodes. The repartitioned set of data is distributed to the second set of compute nodes and a database operation is performed on the repartitioned set of data by the second set of compute nodes.

19 Claims, 15 Drawing Sheets

(56) References Cited

U.S. PATENT DOCUMENTS

2013/0232133 A1\* 9/2013 Al-Omari ........... G06F 16/2456
707/714
2014/0359126 A1 12/2014 Breternitz et al.
2014/0380303 A1 12/2014 Bello et al.

\* cited by examiner

| Node Groups | Bucket Distribution Map |
|---|---|
| NG0 (default computation) | Map {node (1-10), hash buckets} |
| NG1 | Map {node (1-4), hash buckets} |
| NG2 | Map {node (5-10), hash buckets} |
| ... | ... |

| Table Name | Node Group |
|---|---|
| T1 | NG1 |
| T2 | NG2 |
| ... | ... |

COST { init cost, total cost, P} is the estimated cost for one query operator.

P is a data structure used to represent degree of inter-partition parallelism.

P: {NG, D}, where

NG is the identifier of the node group being used for this operation

D is the estimated number of compute nodes that will be participating in the operation:

$$D = \min(n_{distinct}, size_{NG}) \times skew\ factor, where$$

$n_{distinct}$ refers to column cardinality of the join key or the column being hashed on for redistribution. This may be obtained from the catalog column statistics information for base table or from derived statistics information when data being redistributed happens to be intermediate result;

$size_{NG}$ refers to a size of the target node group.

skew factor is used for evaluation of data skew on each compute node after distribution. Skew factor may be represented as a float number ranging from:

$$1/\min(n_{distinct}, size_{NG}) \leq skew\ factor \leq 1.$$

skew factor may be calculated by looking at a histogram of the base table or derived statistics information and compute the percentage of MCV (most common value) within the table cardinality or composite cardinality of an intermediate result.

Cost on Data Redistribution:

Redis$_{Cost}$ = t × w × f + (t × w /s × D), where t is a number of tuples to be processed;
w is a tuple width;
f refers to a cost factor for hashing (may be a calibrated constant);
s is an average data transfer speed through a network (may be a calibrated constant);
D is a degree of inter-partition parallelism with skew factor.

Cost Reduction from Inter-Partition Parallelism (IPParall):

The subsequent operation will re-evaluate the total operation cost with variable D. For example, cost for subsequent Hash Aggregation of Hash Join operation IPParall$_{CostReduction}$ = Cost$_{hashjoin}$/D or Cost$_{hashAgg}$/D

*Fig. 6C*

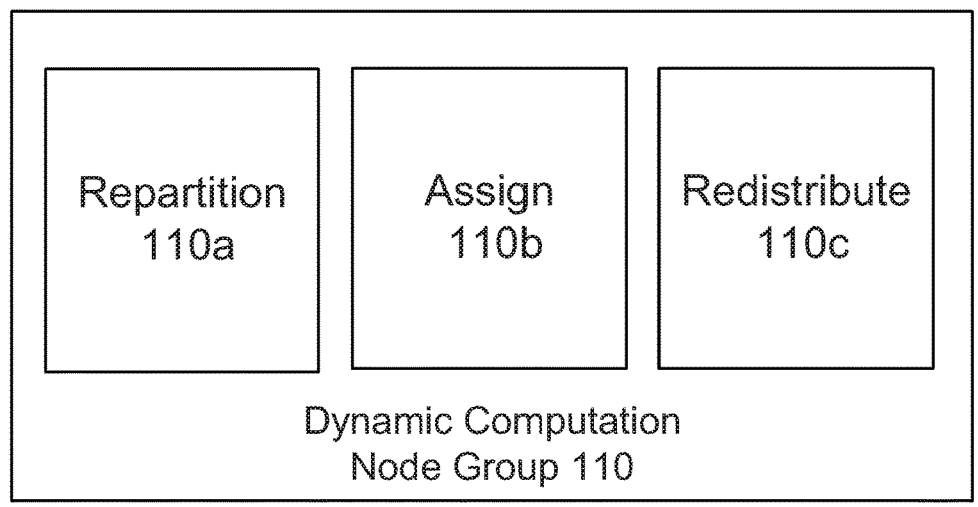
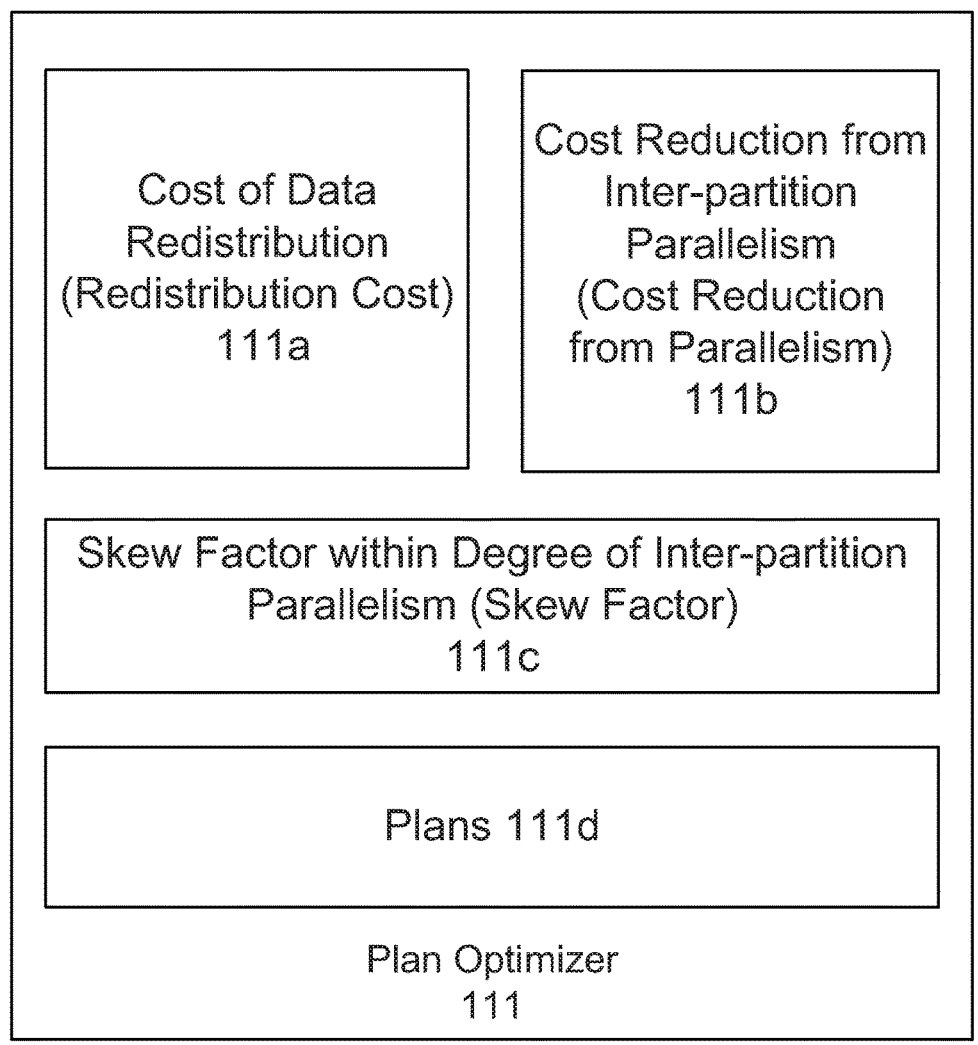
Fig. 11

DYNAMIC COMPUTATION NODE GROUPING WITH COST BASED OPTIMIZATION FOR MASSIVELY PARALLEL PROCESSING

BACKGROUND

Massively parallel processing (MPP) shared nothing relational database management systems (RDBMS) typically include a plurality of shared nothing nodes. A shared nothing node may include at least one storage coupled to at least one compute node. Typically in a MPP shared nothing RDBMS, the number of storages is statically assigned to the number of compute nodes in a particular shared nothing node.

In processing a query to a MPP shared nothing RDBMS, data may need to be repartitioned and transmitted from one shared nothing node to another shared nothing node storing other data that may be needed to respond to the query. This statically assigned architecture between storages and compute nodes may cause underutilization or overutilization of some compute nodes. Also, particular compute nodes may be inefficiently used by a sub-optimal logic plan that retrieves a response to the query, rather than a logic plan that efficiently uses the storage and compute nodes.

SUMMARY

In a first embodiment, the present technology relates to a massively parallel processing shared nothing relational database management system comprising a plurality of storages assigned to a plurality of compute nodes. The system includes one or more processors communicating with a non-transitory memory that stores instructions. The one or more processors execute the instructions to store a set of data in a first set of storages in the plurality of storages. The first set of storages is assigned to a first set of compute nodes in the plurality of compute nodes. The set of data is repartitioned by hashing into a repartitioned set of data. The first set of storages is reassigned to a second set of compute nodes in the plurality of compute nodes. The repartitioned set of data is redistributed to the second set of compute nodes and a database operation is performed on the repartitioned set of data by the second set of compute nodes.

A second embodiment in accordance with the first embodiment, wherein the repartition the set of data includes forming smaller hash buckets of the set of data by hashing.

A third embodiment in accordance with the first embodiment, wherein the repartition is omitted when a repartition key is the same key used to partition the set of data.

A fourth embodiment in accordance with the first embodiment, wherein the reassign includes form a network connections between the first set of storages and the second set of compute nodes, and wherein the distribute includes distribute the repartitioned set of data to the second set of compute nodes by way of the network connections.

A fifth embodiment in accordance with the fourth embodiment, wherein the first set of storages and the first set of compute nodes form a shared nothing node in the system, and wherein the database operation includes at least one of an inner join, scan and redistribute.

A sixth embodiment in accordance with the first embodiment, further comprising the one or more processors executing the instructions to obtain a plurality of logic plans that include the database operation on the set of data stored in the first set of storages. A cost of redistributing the set of data to at least another compute node for each logic plan in the plurality of logic plans is determined. A cost reduction from inter-partition parallelism for each logic plan in the plurality of logic plans is also determined. An optimal logic plan is selected from the plurality of logic plans based on the cost of redistributing the set of data and the cost reduction from inter-partition parallelism.

In another embodiment, the present technology relates to a computer-implemented method for accessing data. The method comprises obtaining a plurality of logic plans to respond to a query. A determination of a cost of redistributing a set of data stored in a storage assigned to a compute node to at least another compute node for each logic plan in the plurality of logic plans is determined. Also, a cost reduction from inter-partition parallelism for each logic plan in the plurality of logic plans is determined. A logic plan is selected from the plurality of logic plans based on the cost of redistributing the set of data and the cost reduction from inter-partition parallelism.

In a further embodiment, the present technology relates to a non-transitory computer-readable medium storing computer instructions, that when executed by one or more processors, cause the one or more processors to perform steps. The steps include store a set of data in a first set of storages in a plurality of storages. The first set of storages is assigned to a first set of compute nodes in a plurality of compute nodes. A plurality of logic plans is obtained to respond a query that accesses the set of data. A cost of redistributing the set of data stored in the first set of storages to a second set of compute nodes for each logic plan in the plurality of logic plans is determined. A cost reduction from inter-partition parallelism for each logic plan in the plurality of logic plans is determined. A logic plan is selected from the plurality of logic plans based on the cost of redistributing the set of data and the cost reduction from inter-partition parallelism. The set of data is repartitioned by hashing into a repartitioned set of data. The first set of storages is reassigned to the second set of compute nodes. The repartitioned set of data is distributed to the second set of compute nodes and a database operation is performed on the repartitioned set of data by the second set of compute nodes to provide an answer to the query.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 1B-C illustrates tables associated with the system shown in FIG. 1 according to embodiments of the present technology.

FIG. 6A illustrates a cost structure according to embodiments of the present technology.

FIG. 6B illustrates a cost on data redistribution according to embodiments of the present technology.

FIG. 6C illustrates a cost reduction from inter-partition parallelism according to embodiments of the present technology.

FIG. 11 is a block diagram that illustrates a software architecture according to embodiments of the present technology.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1A:
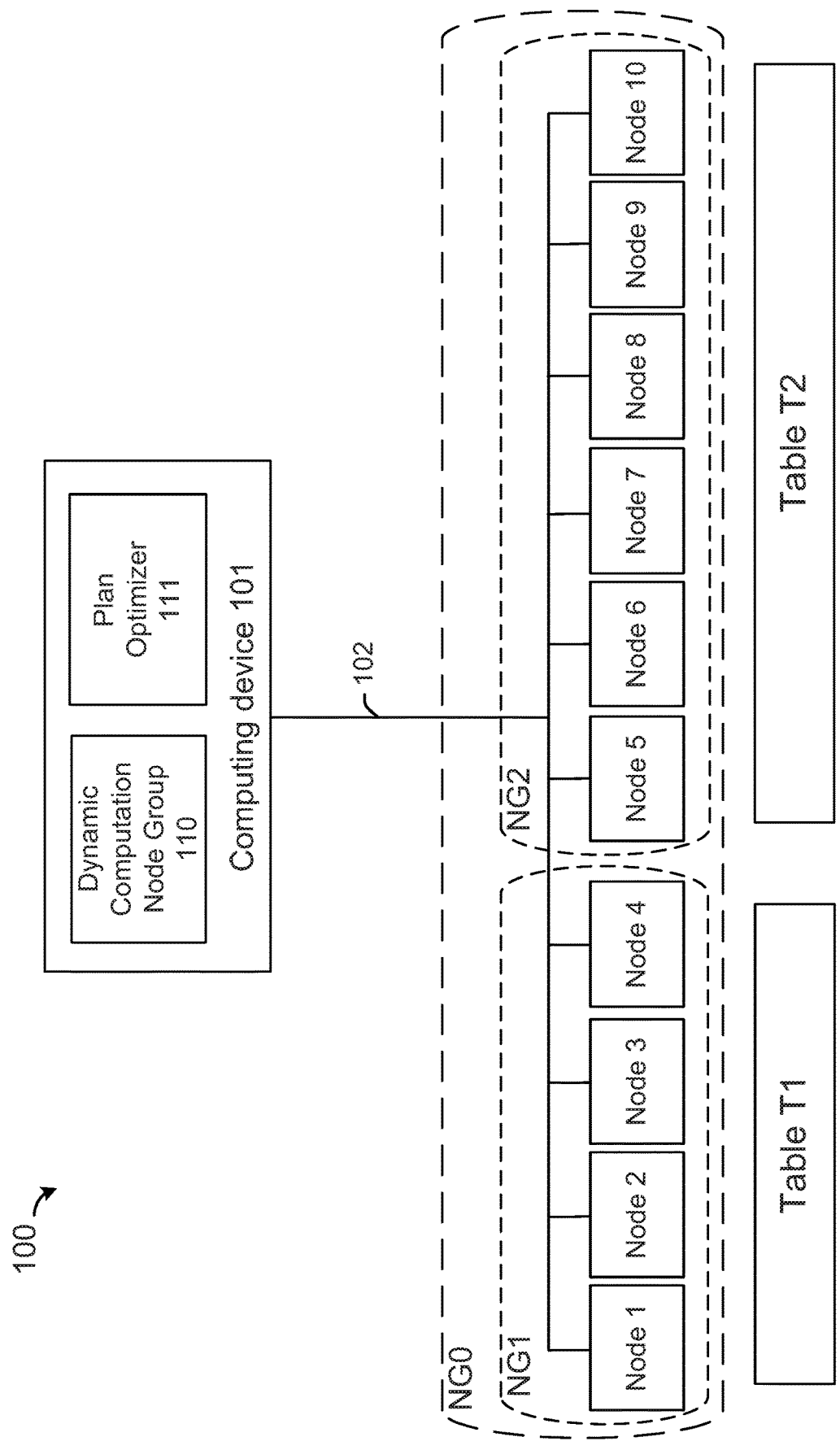
FIG. 1A is a block diagram that illustrates a MPP shared nothing RDBMS according to embodiments of the present technology.

The present technology generally relates to dynamic computation node grouping that decouples storage and computation in a massively parallel processing (MPP) shared nothing relational database management system (RDBMS). The present technology provides the flexibility to enable higher degree of inter-partition processing parallelism by utilizing data redistribution between MPP nodes. Dynamic computation node grouping also adds another dimension for a query or plan optimizer to consider when constructing the optimal logic plan that provides a response to a query.

A data skew aware cost model may be used to select an optimal computation node group at the right stage of the query processing pipeline. A data skew aware cost model enables a plan optimizer to analyze and compare the estimated cost of data redistribution through a network and cost reduction from inter-partition parallelism based on table statistics as well as derived statistics from an intermediate result.

A MPP shared nothing RDBMS having a plurality of computation nodes provides automatic query optimization and execution. A computation node may include at least one storage assigned or coupled to at least one compute node. In embodiments, a plan optimizer selects an optimal logic plan to respond to a received query and one or more computation node groups are formed to execute the optimal logic plan. In embodiments, a MPP shared nothing RDBMS includes a plan optimizer and dynamic computation node group software components to select the optimal logic plan and dynamically group the computation nodes for executing the optimal logic plan. In embodiments, a MPP shared nothing RDBMS decouples storage and computation layers (or assigned groups) for efficiently executing complex queries. The selected optimal logic plan may access sets of data (or tables) that are stored in a plurality of variously sized groups of storages and the system executes the optimal logic plan by dynamically grouping a plurality of compute nodes with the plurality of storages that store the tables.

It is understood that the present technology may be embodied in many different forms and should not be construed as being limited to the embodiments set forth herein. Rather, these embodiments are provided so that this disclosure will be thoroughly and completely understood. Indeed, the disclosure is intended to cover alternatives, modifications and equivalents of these embodiments, which are included within the scope and spirit of the disclosure as defined by the appended claims. Furthermore, in the following detailed description, numerous specific details are set forth in order to provide a thorough understanding of the technology. However, it will be clear that the technology may be practiced without such specific details.

In an embodiment, a RDBMS is a computer-implemented database management system that uses relational methods for storing and retrieving data. Relational databases are computerized information storage and retrieval systems in which data in the form of tables (also known as "relations") are typically stored for use on storage, such as processor readable memory. A "table" includes a set of rows (also known as "tuples" or "records") spanning several columns. Each column in a table includes "restrictions" on the data contents thereof and may be designated as a primary or foreign key in embodiments.

A RDBMS is structured to accept statements to store, retrieve and delete data using high-level query languages such as the Structured Query Language (SQL). The term "query" denominates a set of statements for retrieving data from a stored database. The SQL standard has been promulgated by the International Standards Association. Examples of a SQL standard may include the SQL-92 standard "Database Language SQL" published by the ANSI as ANSI X3.135-1992 and published by the ISO as ISO/IEC 9075: 1992 for the official specification of the 1992 version of the Structured Query Language.

A MPP shared nothing architecture is an implementation in which each computation node includes a compute node having at least one processor with local memory and an assigned storage that may include a direct access storage device (DASD), such as a disk drive. All inter-processor communication is achieved through the use of messages transmitted over a network that couples the compute nodes, or processors. In an embodiment, this type of system architecture is referred to as a MPP system. While this architecture may be the most scalable, it requires a sophisticated inter-processor communications facility to send messages and data between processors. There may be multiple implementations of a MPP shared nothing RDBMS architecture embodiment such as IBM DB2 DPF, Pivotal Greenplum, Amazon Redshift, Actian Matrix, etc.

A computation node group (or node group) is a partition of MPP computation nodes, that may include one or more MPP shared nothing computation nodes in an embodiment. In an embodiment, there may be multiple MPP node groups assigned in MPP shared nothing RDBMS in which a particular set of data (or a particular table) may be statically stored in one node group. A table may be stored in storages of the assigned node group through a specified partition method. A particular partition method may use hash, range and/or round robins methods. Queries may be processed within one node group. When a join database operation requires joining tables stored on different node groups, then one of the tables needs to be repartitioned and transferred into the node group of the other table so that a co-located join database operation may be performed.

A redistribute operation includes a database operation to process a query in which a set of data is repartitioned through a hash partition method and the repartitioned data is distributed into the target node group in an embodiment. A redistribute operation may or may not incur network traffic depending on the node group definition or assignment.

A broadcast operation includes a database operation to process a query in which a set of data is replicated and transferred to every storage of target node group in an embodiment.

Inter-partition parallelism refers to database operations which are subdivided into multiple parts, which are then executed in parallel across one or more partitions of a partitioned database (which may reside on one computation node or on multiple computation nodes). With inter-partition parallelism, the degree of parallelism used is largely determined by the number of partitions created and by the way node groups have been defined or assigned.

Typically, a computational layer (or particular compute nodes) is tightly coupled or statically assigned to a storage layer (or particular storages) in a MPP shared nothing RDBMS. For example, a system may assign tables that are involved in many join operations to the same node group with same partition strategy so that a collocated join can be used for zero data shuffle between group nodes and thus higher performance may be archived.

In contrast, relatively small tables may be assigned or stored in single node or small sized node group so that the small tables don't consume as much resources when being accessed. Tables involved in heavy transaction operations are likely to be assigned to a different node group than tables which are mostly involved in decision support queries.

However sometimes, tables from different node groups may need to be joined together to generate a meaningful response to a query. Similarly, tables from one node group may be heavily aggregated while tables from other node groups may be accessed very infrequently. In these scenarios, a MPP shared nothing RDBMS may only consider one node group (the one that the table statically resides) to process the entire query, and a table from different node group in the case of a join needs to be repartitioned based on a hash strategy and redistributed through a network to the same node group of the other table involved in the join.

As you can see, a resource (one or more node groups) may be underutilized in these scenarios because some of the nodes are not involved in the computation. One method is to heuristically instruct a query optimizer to utilize more nodes or a bigger node group into processing the query. However, this method may be inefficient because it doesn't consider individual operation costs and overall plan cost (or total cost). Overhead costs incurred by transmitting data across a network to target nodes used in a computation may be offset by a benefit of inter-partition parallelism in the target nodes. Intelligently and dynamically selecting an optimal number of computation nodes at particular stages in processing a query may enhance efficiency and performance of a MPP shared nothing RDBMS.

FIG. 1 illustrates a dynamic computation node group 110 and plan optimizer 111 in a MPP shared nothing RDBMS 100 that selects an optimal computation node group for processing an optimal logic plan that responds (answers) to a received query based on various operation costs. As one of ordinary skill in the art would appreciate, portions of a MPP shared nothing RDBMS 100 are not shown to clearly illustrate the present technology. In an embodiment, dynamic computation node group 110 and plan optimizer 111 are software components executed by computing device 101. In an embodiment, computing device 101 is coupled to computation nodes NG0 by a network 102. In an embodiment, computing device 101 may be a controller.

A MPP shared nothing RDBMS 100 is usually partitioned into multiple node groups, such as node group NG1 and node group NG2, which contains various sized sets of data, such as table T1 and table T2. A response to a query may require a specific node group to perform a database operation such as a scan, aggregation, redistribute or (inner) join database operation. In order to join two tables together (such as tables T1 and T2), the join keys from the two participant tables are required to be partitioned into the same node group through a consistent hashing method. As a node group is typically statically created through a data definition language (DDL) command, and tables are statically assigned to the respective node group, some operators such as scan can only be performed within that specific node group due to the shared nothing architecture.

However, once a table (or set of data) is loaded from a storage into storage of a MPP node, the set of data may be repartitioned through another hashing method and transferred to other compute nodes through network 102 by a redistribute operator. In an embodiment, this is where computation nodes are not bound by the storage layer (or storages) and can be elastically or dynamically increased to enable a higher degree of inter-partition parallelism. In an embodiment, dynamic computation node group 110 executed by computing device 101 performs this function.

As compared to a static node group, a user does not have to manually create the dynamic node group in an embodiment. All computation nodes in a node group may be considered as one dynamic computational node group unless a user specifically limits the size of this node group due to reasons such as a resource constrain requirement.

While data may be repartitioned and redistributed into a larger dynamic node group to gain a higher degree of parallel processing power, the redistribution cost through network 102 may be considered as a bottle neck of such a system. In order to determine an optimal node group for computation without sacrificing too much cost on transmitting data between computation nodes through network 102, a cost of data redistribution may be balanced against the cost reduction from enabling higher degree parallelism by involving more computation nodes for later query processing.

For example, consider a simple join operation of a small table T1 in a small node group NG1 which contains 4 computation nodes; join a big table T2 from a larger node group NG2 which contains 6 computation nodes. There are total of 10 computation nodes (nodes 1-10) in node group NG0 (including node groups NG1 and NG2) which are all considered as one dynamic computation node group. In order to perform this join, a typical MPP shared nothing RDBMS would likely generate a plan to redistribute table T1 into the larger node group NG2 and finish the join with table T2 stored inside node group NG2. MPP shared nothing RDBMS 100 will include the dynamic computation node group into a plurality of redistribution strategies, and carefully evaluate the cost of each redistribution strategy:

1. Table T1 redistribute/broadcast to node group NG2 and then join table T2;
2. Table T2 redistribute/broadcast to node group NG1 and then join T1;

3. Tables T1 and T2 both redistribute to node group NG0 and then perform the join.

In an embodiment, a cost evaluation is then recursively carried out in bottom up manner until a set of complete logic plans for the query with each of the logic plans having a summed cost of data redistribution through network 102 as well as operator cost reduction from inter-partition parallelism. In an embodiment, plan optimizer 111 selects an optimal logic plan from a set of possible (or candidate) logic plans to respond to the query by selecting the logic plan with the least total cost. Notice in redistribution strategy #3 above, although both tables T1 and T2 are redistributed into the largest node group NG0 which may incur a higher cost on data redistribution than the other two redistribution strategies #2 and #3, the total cost for redistribution strategy #3 may actually be less because it enables more computation nodes to participant in subsequent database operations such as another join operator, or sort operator, etc. When plan optimizer 111 obtains a set of logic plans for responding to a query that all have very similar total costs (for example within 1% error tolerance), plan optimizer 111 selects a logic plan that uses the least number of computation nodes in an embodiment.

An example of selecting a particular optimal logic plan and a particular computation node group for a particular query by dynamic computation node group 110 and plan optimizer 111 is described below. As described above, FIG. 1 illustrates a MPP shared nothing RDBMS 100 including a node group NG0 partitioned into smaller node groups NG1 and NG2 storing tables T1 and T2.

Meta information representing node grouping of MPP shared nothing RDBMS 100 may be stored in a database catalog in the form of table 150 shown in FIG. 1B. Similarly, table T1 and bigger table T2 are assigned to node groups NG1 and NG2, respectively. This mapping between relation and node group may be represented in another database catalog in the form of table 180 shown in FIG. 1C. In embodiments, a database catalog including tables 150 and 180 may be stored in memory 1020 of computing device 101 shown in FIG. 10

Figure 2:
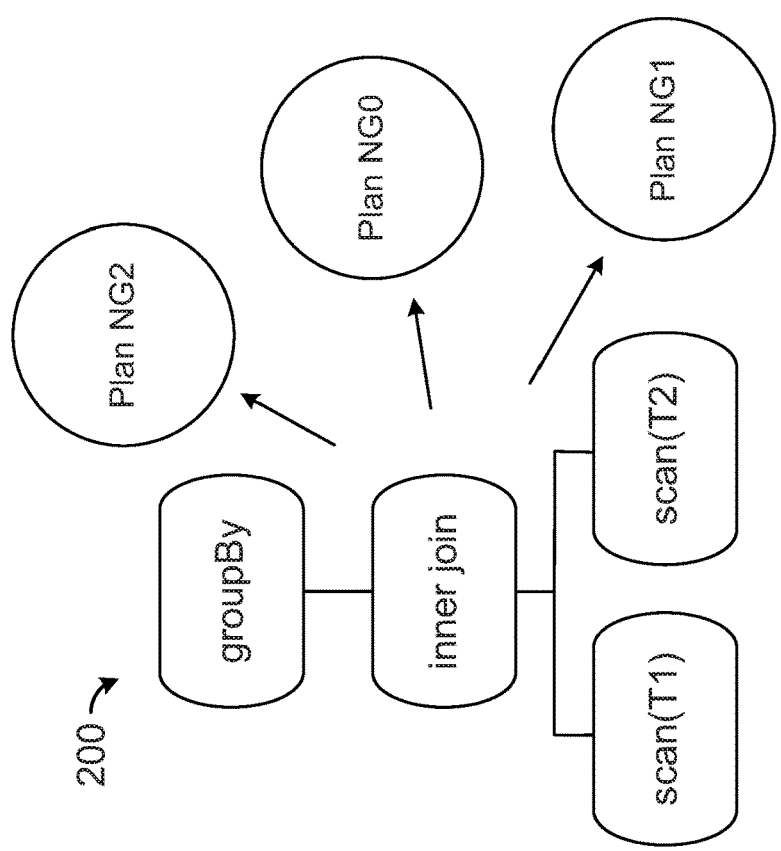
FIG. 2 illustrates a syntactic query parse tree and associated logic plans according to embodiments of the present technology.
Figure 5:
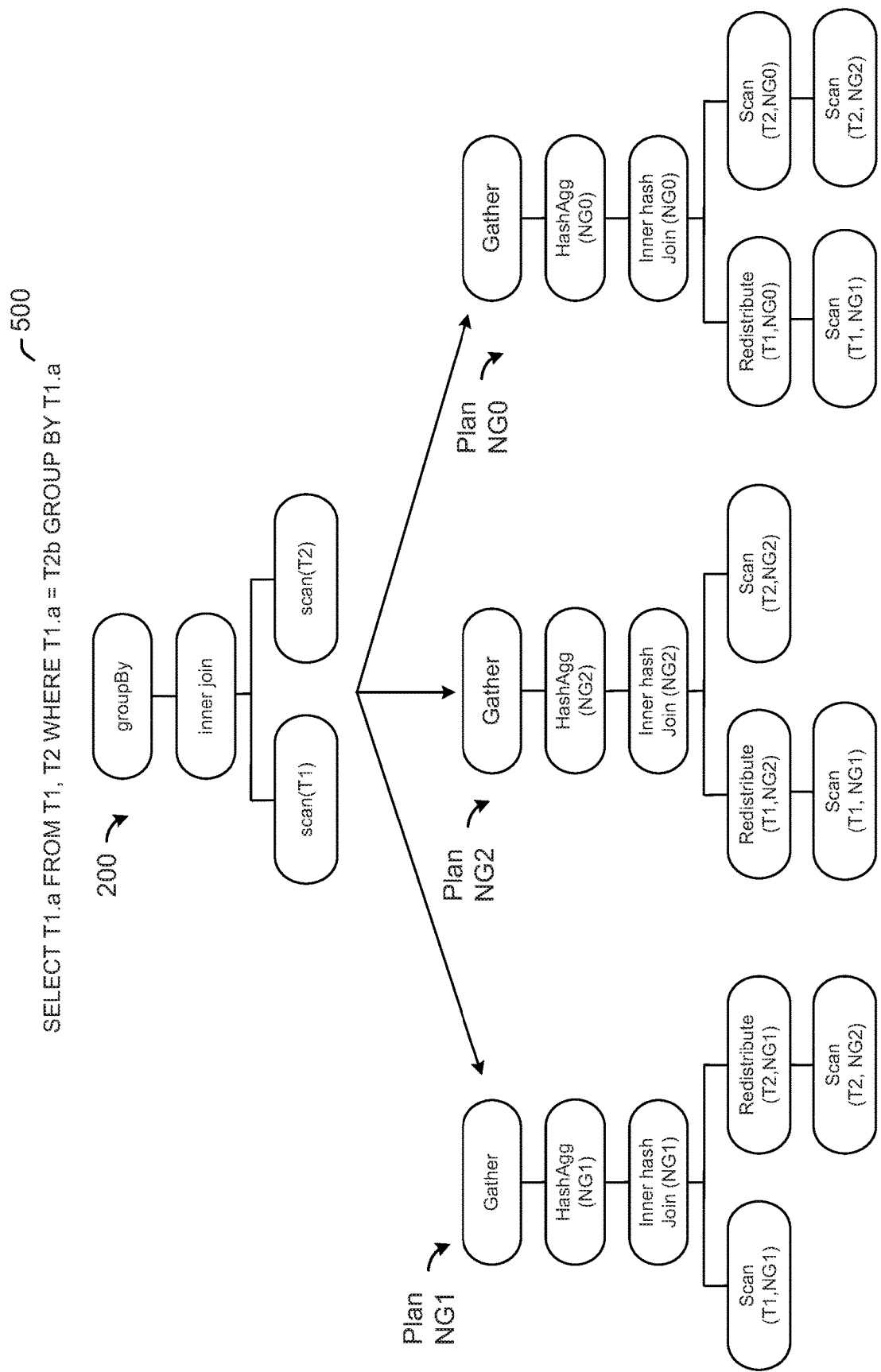
FIG. 5 illustrates obtaining a plurality of logic plans for responding to a query according to embodiments of the present technology.

An example query 500 as illustrated by FIG. 5 and shown below may be submitted to a MPP shared nothing RDBMS 100:

SELECT T1.$a$ FROM T1, T2 WHERE T1.$a$=T2.$b$ GROUP BY T1.$a$, where the distribution of T1 is hash distributed on (T1.$a$, NG1) and the distribution of T2 is hash distributed on (T2.$b$, NG2). The syntactic query parse tree 200 is illustrated in FIG. 2.

Figure 3:
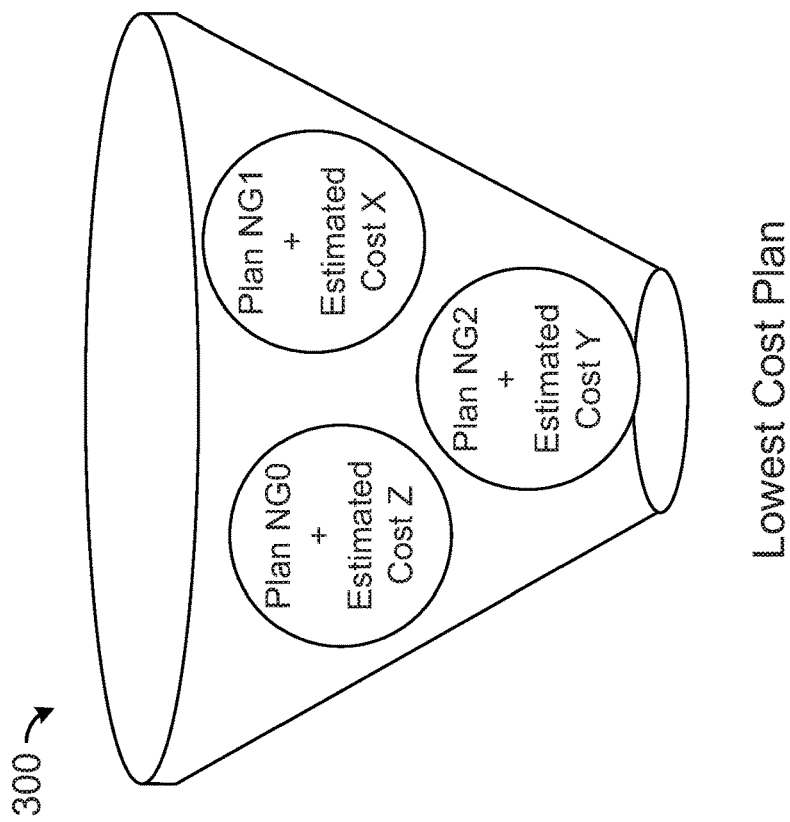
FIG. 3 illustrates logic plans with estimated costs and selecting a logic plan having a lowest estimated cost according to embodiments of the present technology.

FIG. 3 illustrates logic plans with estimated total costs and selecting a logic plan having the lowest estimated total cost according to embodiments of the present technology. Plan optimizer 111 figuratively functions similar to funnel 300 in selecting an optimal logic plan by obtaining the lowest estimated total cost of estimated total costs Z, X and Y associated with logic plans NG0, NG1 and NG2. The estimated total costs Z, X and Y are compared and the associated logic plan with the lowest estimated total cost is selected in an embodiment.

Based on a set of predefined rules and the meta information from a database catalog, query 500 will be syntactically rewritten into equivalent query operators during query compilation and further transformed into a set of logical plans for optimization. In an embodiment, plan optimizer 111 performs this function. As can be seen from the candidate logical plans shown in FIGS. 2, 3 and 7, there are three ways to execute the join and group by operation.

Plan NG1: redistribute T2 into NG1 and join T1 and T2 within NG1, and the subsequent group by operation which transformed into hash aggregation also performs in NG1.

Plan NG2: redistribute T1 into NG2 and join T1 and T2 within NG2, and the subsequent hash aggregation performs within NG2.

Plan NG3: redistribute both T1 and T2 into NG0, and perform join and the subsequent hash aggregation within NG0.

As can be seen, a main difference between plans NG0, NG1 and NG2 is that a dynamic computation node group is formed by dynamic computation node group 110 and information from a database catalog. Plan NG0 utilizes all compute nodes to do the join and hash aggregation operation as opposed to the plan NG1 and NG2 which only utilize a subset of computation nodes in an embodiment.

In an embodiment, plan optimizer 111 will then enumerate through each logical plan, and carefully compute and sum the cost of each operator in order to obtain the total cost of each logic plan. To compute the total cost of the extra dimension introduced by a dynamic node group, a few new variables are maintained throughout the logic plan evaluation process. These new variables include cost on data redistribution to a target node group (cost of redistributing) as well as cost reduction from inter-partition parallelism in the target node group.

FIG. 6A illustrates a cost structure or model for dynamic group information and a degree of inter-partition parallelism. A cost value is an estimated cost for one query operator. P is a data structure used to represent degree of inter-partition parallelism. NG is an identifier of the node group being used for an operator (operation), where variable D is an estimated number of computation nodes that will participate in the operation. In an embodiment, the variable D is represented by:

$$D=\min(n_{distinct},\text{size}_{NG})\times\text{skew factor} \quad (1)$$

$n_{distinct}$ refers to the column cardinality of a join key or the column being hashed on for redistribution. This may be obtained from catalog column statistic information for a base table or from derived statistics information when the data being redistributed happens to be an intermediate result. $\text{size}_{NG}$ refers to a size of the target node group.

Notice that the variable D in the above cost representation may or may not equal to the size of the participating node group (size here refer to the number of nodes in the node group) due to possible data skew (or skew factor) introduced by hash partitioning. A rationale behind variable D is to model the effect of data skew into the degree of parallelism as described below.

To compute a cost for data redistribution, a redistribution operation within a MPP shared nothing RDBMS should be understood in context of a hash partition method used in the target node group. This is to ensure the final result after redistribution share exactly the same hash partition strategy of the table from the target node group so that data from two tables can be joined properly. Although hash buckets may be randomly distributed in the node group to avoid data skew, the value distribution of the data itself and the hash method used may still introduce some level of skewness, and thus a skew factor is introduced as defined in FIG. 6A and below:

Skew factor is used for further evaluation of data skew on each computation node after redistribution. Skew factor may be represented as a float number ranging from:

$$\frac{1}{\min(n_{distinct}, size_{NG})} < \text{skew factor} \leq 1 \qquad (2)$$

Skew factor may be calculated by looking at a histogram of the base table or derived statistics information and compute a percentage of MCV (most common value) within the table cardinality or composite cardinality of an intermediate result.

The following scenarios illustrate what the calculation of variable D (or estimated number of computation nodes that will participate in an operation) models:

First, the column being redistributed has less distinct values than the number of nodes from the target node group, then it is known that only the number of distinct values of compute nodes will be holding the data after redistribution by the hashing method, otherwise it will be the size of the target node group.

Second, once data has been distributed onto the compute nodes K, in the best scenario, all nodes receive the same amount of data, and the skew factor will be 1, and the worst case is that one node receives most of the data, and the skew factor will be close to 1/K.

Once a value of variable D is calculated, a pretty good estimate of the degree of inter-partition parallelism with skew awareness may be obtained and a cost on data redistribution may be further calculated as described below and illustrated in FIG. 6B.

Figure 4:
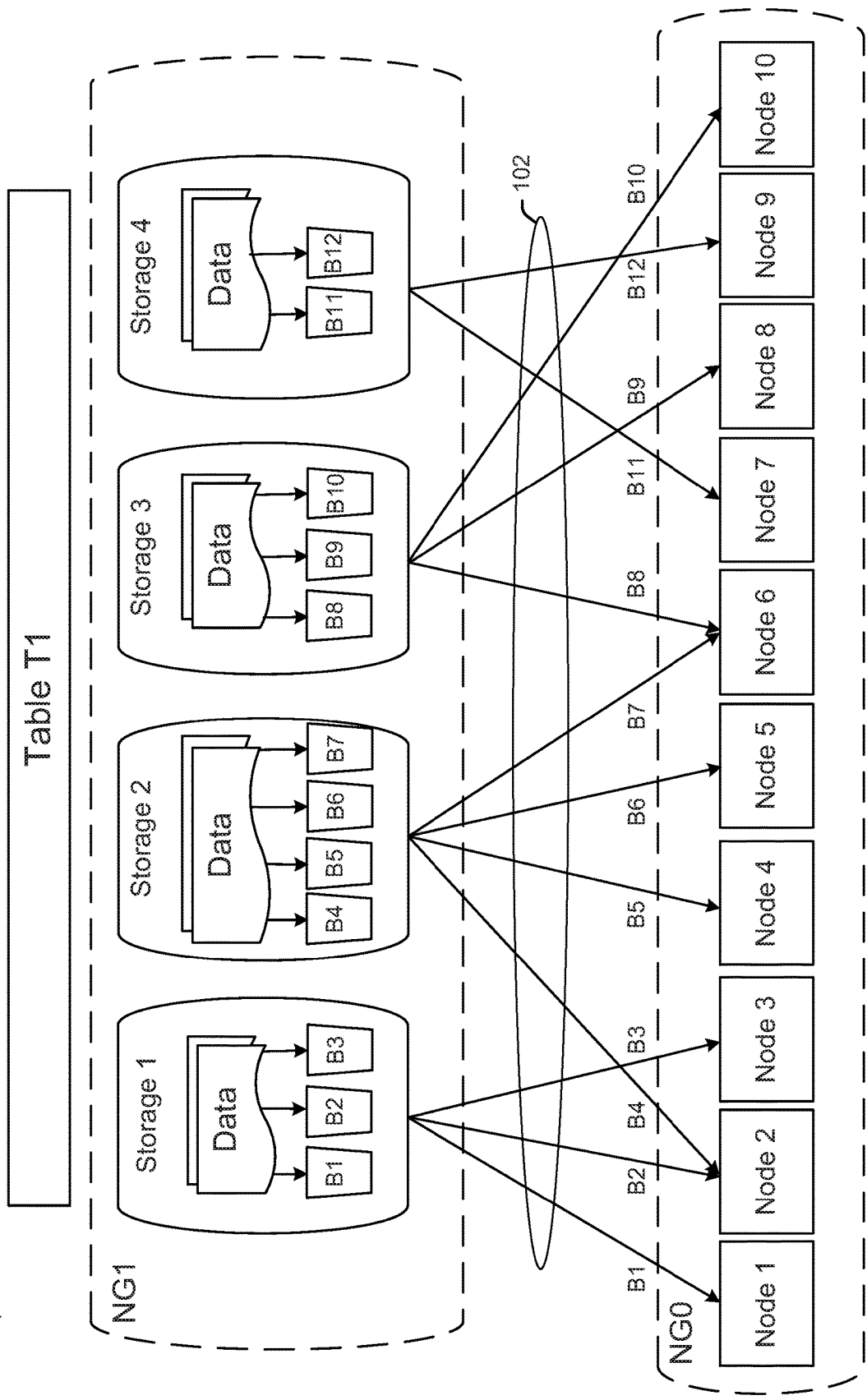
FIG. 4 is a block diagram that illustrates a static storage group and dynamic computation group according to embodiments of the present technology.

For example in FIG. 4, a logic plan NG0 is used to demonstrate how data is redistributed from a static node group NG1 to a dynamic computation node group NG0, as illustrated by MMP shared nothing RDBMS 400. MMP shared nothing RDBMS 400 includes a node group NG1 having four storages 1-4 coupled by network 102 to node group NG0 having compute nodes 1-10. In an embodiment, computing device 101 is coupled to network 102 as illustrated in FIG. 1.

As can be seen in FIG. 4, table T1 from node group NG1 needs to be repartitioned into a range of hash buckets B1-B12 (different database systems may use different sizes of hash buckets). Then the hash buckets B1-B12 are distributed to the compute nodes (nodes 1-10) in node group NG0, based on the hash bucket to node map associated with node group NG0, which is recorded in table 150. Larger hash buckets may be repartitioned into smaller hash buckets in some examples. In an embodiment, the total $Redis_{Cost}$ may be divided into the cost of a hash function plus the cost of sending data through a network 102, as illustrated by a $Redis_{Cost}$ equation shown in FIG. 6B.

A cost of data redistribution, or in an embodiment a $Redis_{Cost}$ shown in FIG. 6B, may be interpreted as the upfront hashing cost on fixed amount of data, which is represented as transferring an amount of data through a network with a fixed single channel network speed S (average transfer speed) times variable D (degree of inter-partition parallelism with skew factor). This estimated cost of data redistribution may be fairly accurate in regards to elapse time for redistribution of data between node groups. However, transferring data within the same computation node may need to be considered. For example, some of the hash buckets in FIG. 4 are transferred between the same nodes because node group NG1 is a subset of node group NG0. For a special case where transferring data from node group NGx to node group NGy does not incur any network traffic (all data are shuffled within one physical machine), an adjustment may be provided to the variable S to reduce the cost of transfer in calculating $Redis_{Cost}$.

From logic plans NG1, NG2 and NG0 illustrated in FIG. 5, notice that the remaining inner hash join and hash aggregation operations/steps are performed within the target compute node group from redistribution of the data set. With the aid of variable D derived from the redistribution step, an estimated cost reduction for parallelization may be obtained by dividing a typical operator cost of a hash join or hash aggregation operation by variable D (degree of inter-partition parallelism with skew factor). The cost of hash join or hash aggregation operations may be defined by a particular system or obtained from statistics. Accordingly in an embodiment, an estimated cost reduction from inter-partition parallelism of degree D ($IPParall_{CostReduction}$) equals:

$$\frac{Cost_{hashJoin}}{D} \text{ or } \frac{Cost_{hashAgg}}{D}$$

as illustrated in FIG. 6C. This estimated cost reduction $IPParall_{CostReduction}$ provides a general idea of how much computation power is utilized within the targeted node group as well as how much cost is incurred in regards to an operation elapse time.

Figure 7:
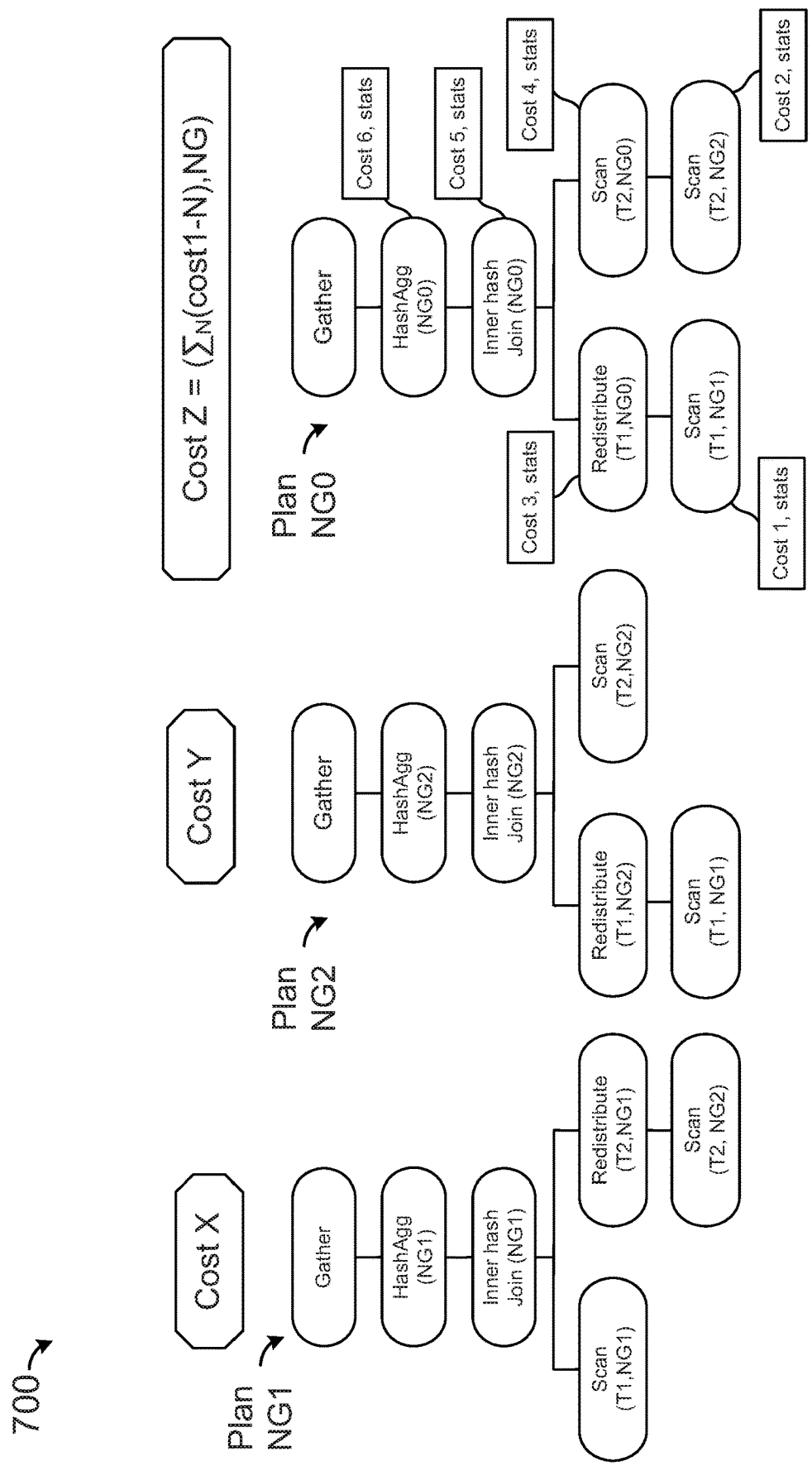
FIG. 7 illustrates determining total costs associated with a plurality of logic plans according to embodiments of the present technology.

FIG. 7 illustrates determining costs associated with a plurality of logic plans according to embodiments of the present technology. In particular, FIG. 7 illustrates how total estimated costs X, Y and Z, associated with logic plans NG1, NG2 and NG0, are calculated by factoring in both cost of data redistribution and subsequent reduction from inter-partition parallelism. FIG. 7 illustrates how total estimated cost Z (as well as total estimated costs X and Y) is a sum of a cost for each database operation, such as a cost 1, and stats that are associated with the scan (T1, NG1) database operation in logic plan NG0. In an embodiment, total estimated cost Z is a function of 6 costs associated with at least 6 database operations. Each cost at each database operation also has associated statistic (stats) or histogram information for each intermediate result/step.

With the combined cost view of both redistribution into a different computation node group and the subsequent cost reduction from inter-partition parallelism, plan optimizer 111 is able to identify an optimal compute node group to be utilized at the right step. Assuming a uniform data distributed scenario, when the join and group by operations are more intensive than re-partition and distribution of data across a network, then plan NG0 is more likely to be selected due to more compute nodes being involved to handle the join and aggregate database operations. Plan NG2 is more likely to be selected when a lot of data is distributed across a network, but the subsequent join and group by operation is relatively light loaded. Plan NG1 may be pruned in an early stage of optimization to save search space, since the degree of parallelism for plan NG1 is relatively lower than Plans NG0 and NG2.

Figure 8:
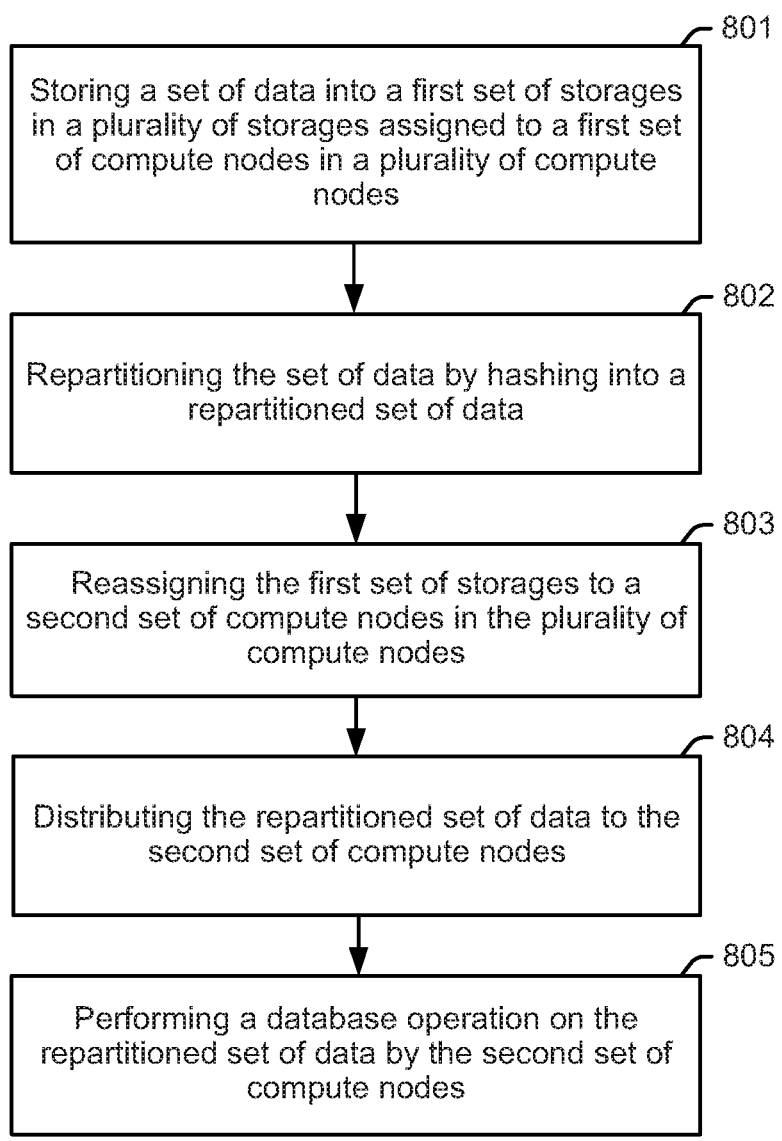
FIG. 8 is a flowchart that illustrates a method for dynamic computation node grouping according to embodiments of the present technology.
Figure 9A:
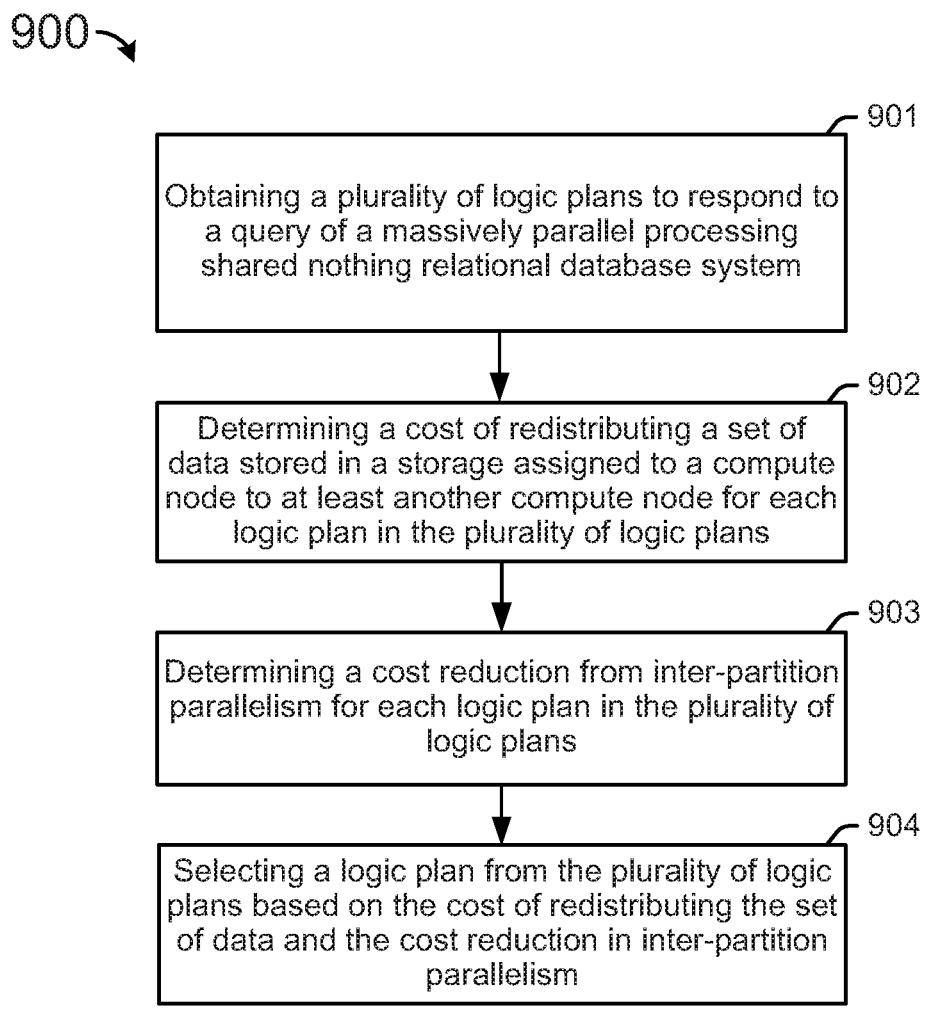
FIGS. 9A-C are flowcharts that illustrate methods for selecting an optimal logic plan from a plurality of logic plans according to embodiments of the present technology.
Figure 9B:
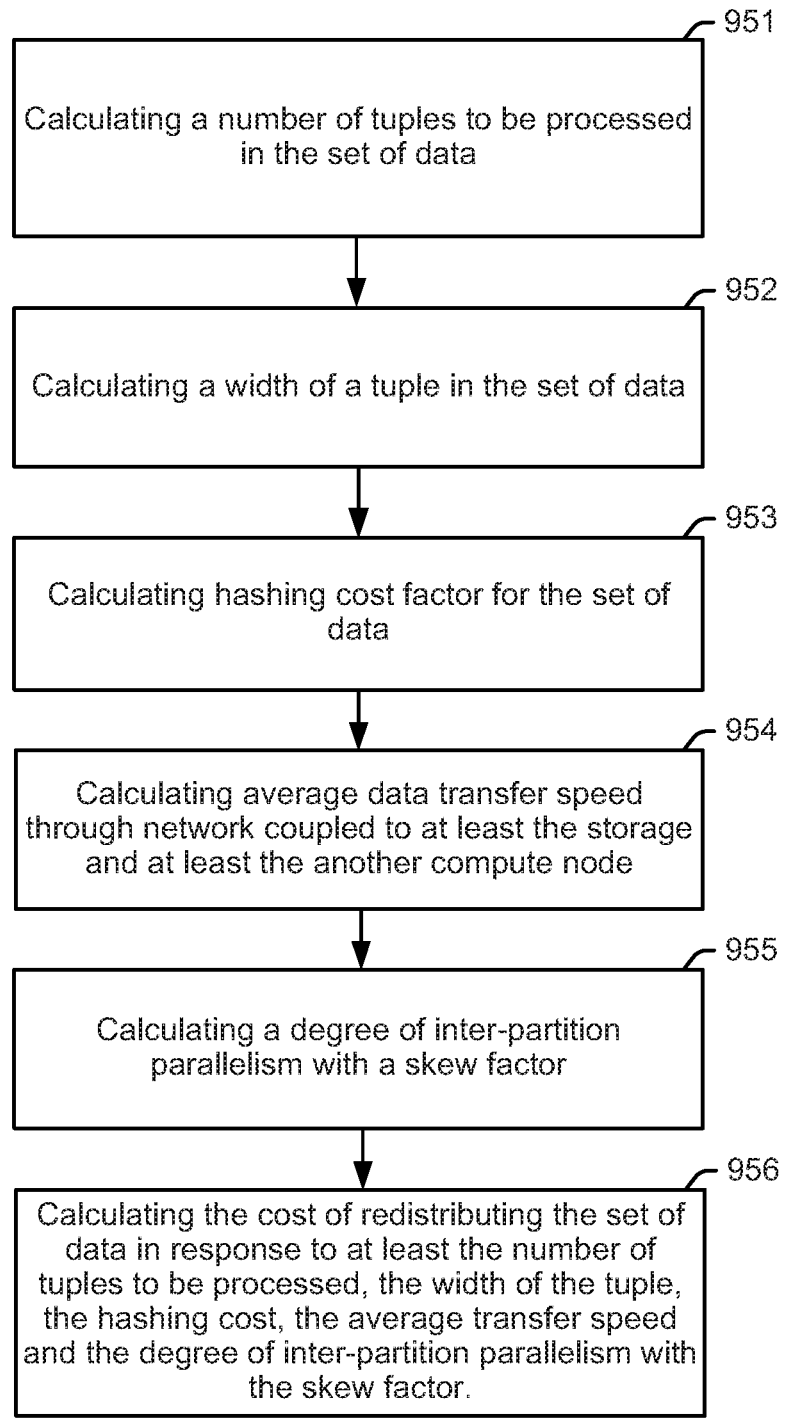
Figure 9C:
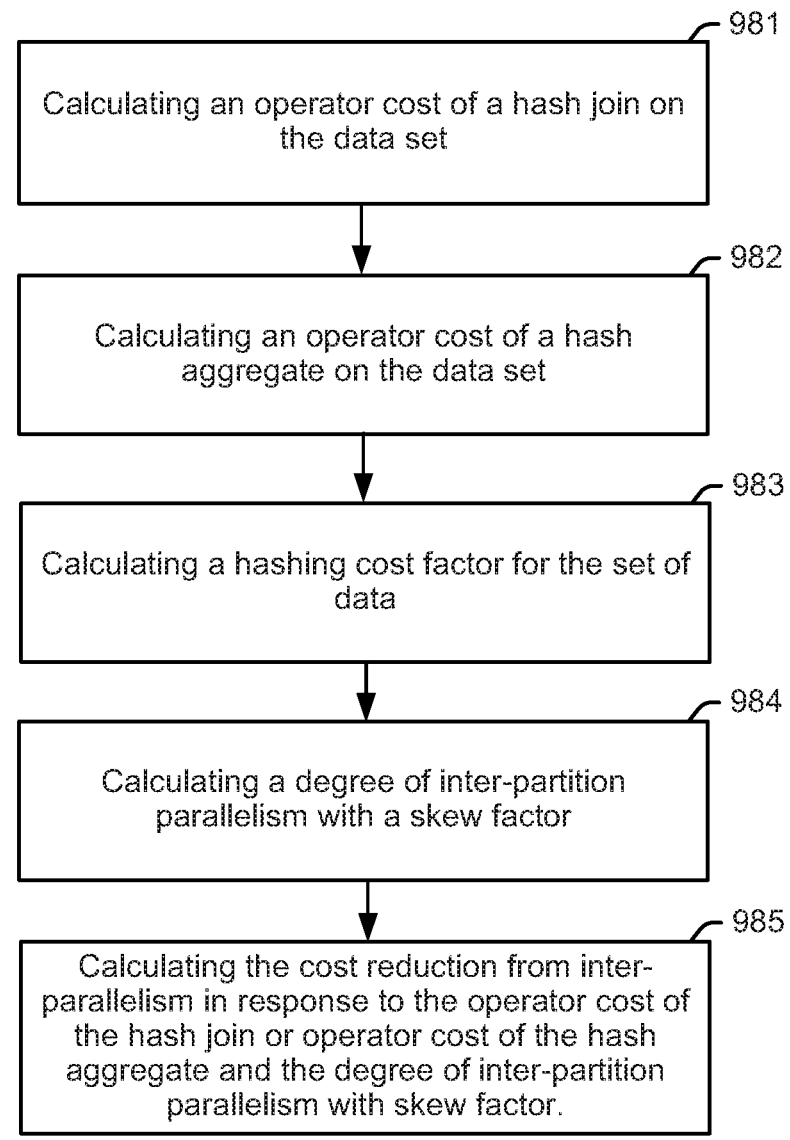
Figure 9D:
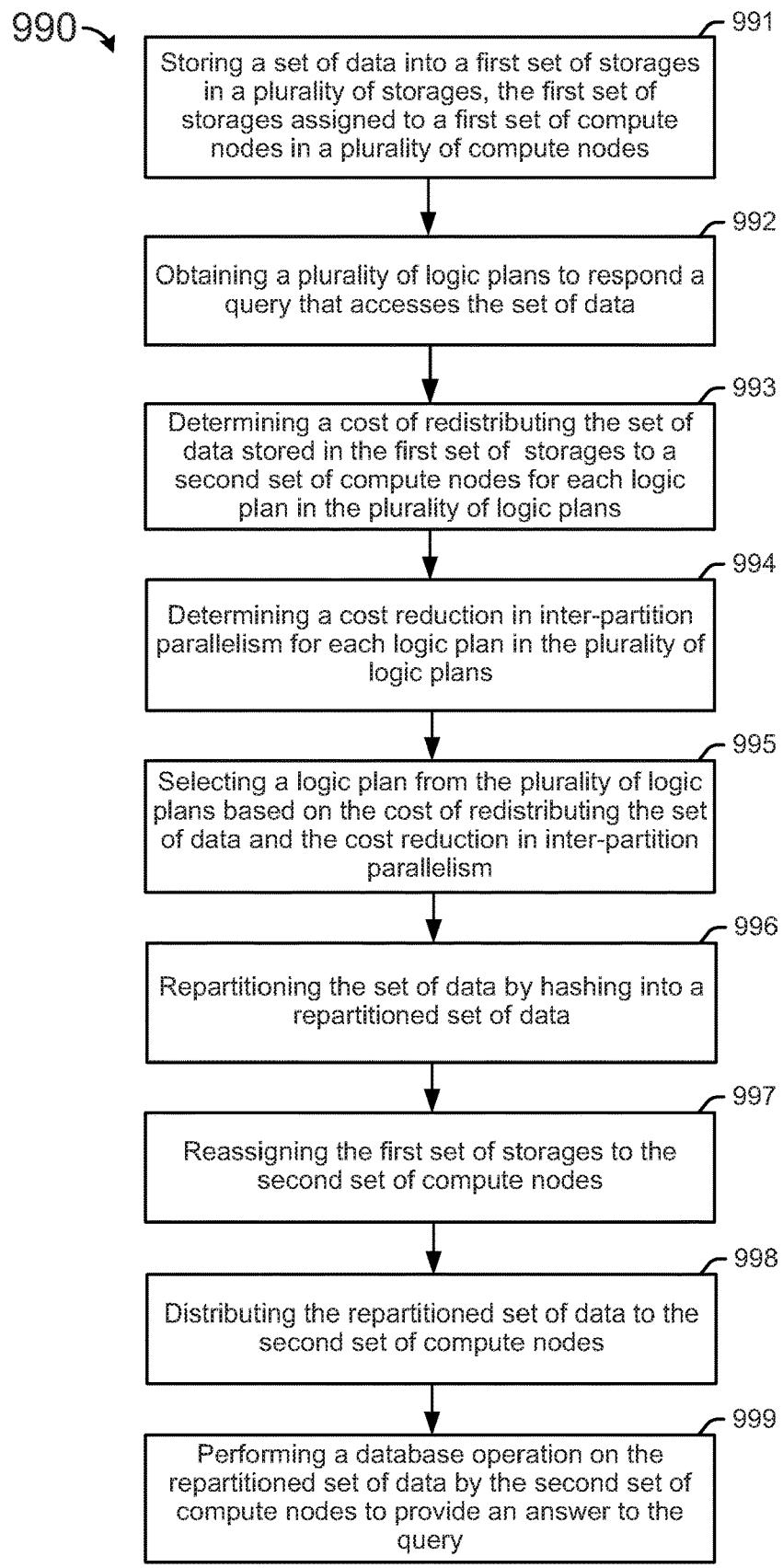
FIG. 9D is a flowchart that illustrates a method for selecting an optimal logic plan and node grouping according to embodiments of the present technology.

FIG. 8 is a flowchart that illustrates a method for dynamic computation node grouping according to embodiments of the present technology. FIGS. 9A-C are flowcharts that illustrate methods for selecting an optimal logic plan from a plurality of logic plans according to embodiments of the present technology. FIG. 9D is a flowchart that illustrates a method for selecting an optimal logic plan from a plurality of logic plans and dynamic computation node grouping according to embodiments of the present technology.

In embodiments, flowcharts in FIGS. 9A-D are computer-implemented methods performed, at least partly, by hardware and software components illustrated in FIGS. 1, 4 and 10-11 and as described below. In an embodiment, software components illustrated in FIG. 11, executed by one or more processors, such as processor 1010 shown in FIG. 10, perform at least a portion of the methods.

FIG. 8 is a flowchart that illustrates a method 800 for dynamic computation node grouping according to embodiments of the present technology. In FIG. 8 at 801, a set of data is stored into a first set of storages in a plurality of storages. The first set of storages is assigned to a first set of compute nodes in a plurality of compute nodes. In an embodiment, a set of data, such as table T1, is stored in storages 1-4 of node group NG1 as illustrated in FIG. 4. In an embodiment, processor 1010 executes software components to store the set of data.

At 802 the set of data is repartitioned by hashing into a repartitioned set of data. In an embodiment, dynamic computation node group 110, in particular repartition 110a, executed by processor 1010 performs at least a portion of this function as described herein and illustrated in FIGS. 10-11. The repartition may be omitted when a repartition key is the same key used to partition the set of data in an embodiment.

At 803 the first set of storages is reassigned to a second set of compute nodes in the plurality of compute nodes. In an embodiment, dynamic computation node group 110, in particular assign 110b, executed by processor 1010 performs at least a portion of this function. In particular, network 102 is reconfigured in response to a signal generated by computing device 101 via network interface 1050.

At 804 the repartitioned set of data is distributed (or redistributed) to the second set of compute nodes. Similar to above, processor 1010 and dynamic computation node group 110, in particular redistribute 110c, performs at least a portion of this function.

At 805 a database operation on the repartitioned set of data is performed by the second set of compute nodes, such as compute nodes 1-10 in node group NG0 illustrated in FIG. 4. In embodiments, a database operation may include, but is not limited to, a hash aggregate (HashAgg), inner hash join, scan, redistribute, inner join or group by operation.

FIG. 9A is a flowchart that illustrates a method 900 for obtaining an optimal logical plan for responding to a query for a RDBMS according to embodiments of the present technology. In FIG. 9A at 901 a plurality of logic plans are obtained in response to a query, such as a query for a MPP shared nothing RDBMS. In an embodiment, plan optimizer 111, in particular plans 111d, executed by processor 1010 performs at least a portion of this function as described herein and illustrated in FIGS. 10-11. In an embodiment, a plurality of logic plans are obtained from a syntactic query parse tree.

At 902 a cost of redistributing a set of data stored in a storage assigned to a compute node to at least another compute node for each logic plan in the plurality of logic plans is determined. In an embodiment, plan optimizer 111, in particular cost of data redistribution 111a, executed by processor 1010 performs at least a portion of this function.

At 903 a cost reduction from inter-partition parallelism for each logic plan in the plurality of logic plans is determined. In an embodiment, plan optimizer 111, in particular cost reduction from parallelism 111b, executed by processor 1010 performs at least a portion of this function.

At 904 an optimal logic plan from the plurality of logic plans based on the cost of redistributing the set of data and the cost reduction from inter-partition parallelism is selected. In an embodiment, plan optimizer 111, in particular plans 111d, executed by processor 1010 performs at least a portion of this function. In an embodiment, a logic plan with the lowest total estimated cost as described herein and illustrated in FIGS. 3 and 7 is selected in embodiments FIG. 9B is a flowchart that illustrates a method 950 for calculating a cost of redistributing a set of data according to embodiments of the present technology. In an embodiment, method 950 performs the function at 902 in FIG. 9A described above. In an embodiment, plan optimizer 111, in particular cost of data redistribution 111a, executed by processor 1010 performs at least a portion of this function, as well as other functions in method 950, as described herein and illustrated in FIGS. 10-11.

At 951 a number of tuples to be processed in the set of data is calculated.

At 952 a width of a tuple in the set of data is calculated.

At 953 a hashing cost factor for the set of data is calculated.

At 954 an average data transfer speed through a network coupled between at least the storage and at least another compute node is calculated.

At 955 a degree of inter-partition parallelism with a skew factor is calculated.

At 956 a cost of redistributing the set of data is calculated in response to at least the number of tuples to be processed, the width of the tuple, the hashing cost factor, the average data transfer speed and the degree of inter-partition parallelism with the skew factor.

FIG. 9C is a flowchart that illustrates a method 980 for calculating a cost reduction from inter-partition parallelism with skew factor according to embodiments of the present technology. In an embodiment, method 980 performs the function at 903 in FIG. 9A described above. In an embodiment, plan optimizer 111, in particular cost reduction from parallelism 111b, executed by processor 1010 performs at least a portion of this function, as well as other functions in method 980, as described herein and illustrated in FIGS. 10-11.

At 981 an operator cost of a hash join on the data set is calculated.

At 982 an operator cost of a hash aggregate on the data set is calculated.

At 983 a hashing cost factor for the set of data is calculated.

At 984 a degree of inter-partition parallelism with a skew factor is calculated. In an embodiment, plan optimizer 111, in particular skew factor 111c, executed by processor 1010 performs at least a portion of this function.

At 985 the cost reduction from inter-parallelism is calculated in response to the operator cost of the hash join or the operator cost of the hash aggregate and the degree of inter-partition parallelism with the skew factor.

FIG. 9D is a flowchart that illustrates a method 990 for selecting an optimal logic plan from a plurality of logic plans and dynamic computation node grouping according to embodiments of the present technology. In an embodiment, plan optimizer 111 and dynamic computation node group 110 executed by processor 1010 performs at least a portion of the functions as described herein and illustrated in FIGS. 10-11.

At 991 a set of data is stored into a first set of storages in a plurality of storages. The first set of storages is assigned to a first set of compute nodes in a plurality of compute nodes.

At 992 a plurality of logic plans is obtained to respond to a query that accesses the set of data.

At 993 a cost of redistributing the set of data stored in the first set of storages to a second set of compute nodes for each logic plan in the plurality of logic plans is determined.

At 994 a cost reduction from inter-partition parallelism for each logic plan in the plurality of logic plans is determined.

At 995 a logic plan is selected from the plurality of logic plans based on the cost of redistributing the set of data and the cost reduction from inter-partition parallelism.

At 996 the set of data is repartitioned by hashing into a repartitioned set of data.

At 997 the first set of storages is reassigned to the second set of compute nodes.

At 998 the repartitioned set of data is redistributed to the second set of compute nodes.

At 999 a database operation is performed on the repartitioned set of data by the second set of compute nodes to provide an answer to the query.

Figure 10:
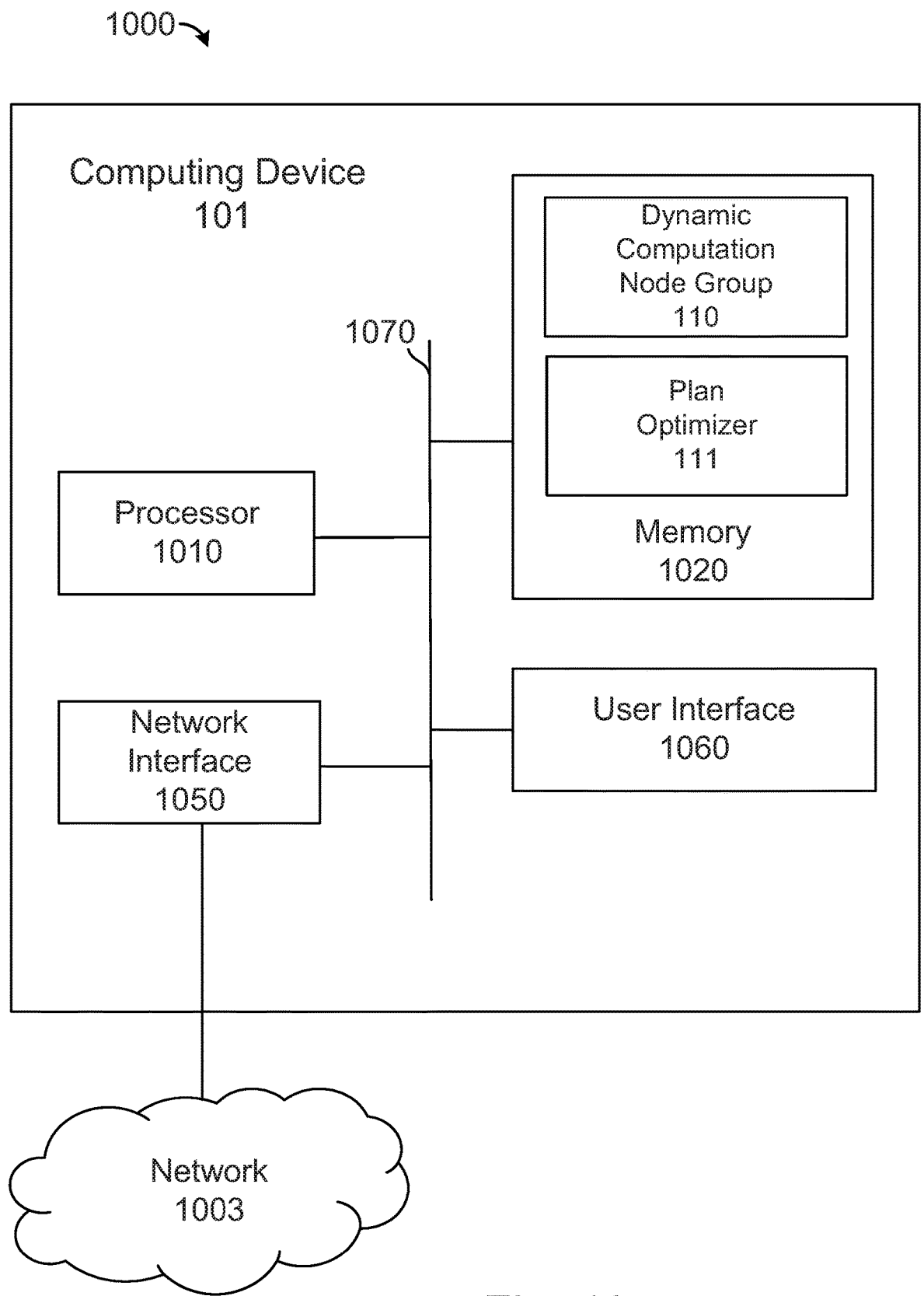
FIG. 10 is a block diagram that illustrates a hardware architecture according to embodiments of the present technology.

FIG. 10 illustrates a hardware architecture 1000 for computing device 101 used to form dynamic computation node groups and select an optimal logic plan to respond to a query. Computing device 101 may include a processor 1010, memory 1020, user interface 1060 and network interface 1050 coupled by a interconnect 1070. Interconnect 1070 may include a bus for transferring signals having one or more type of architectures, such as a memory bus, memory controller, a peripheral bus or the like.

Computing device 101 may be implemented in various embodiments. Computing devices may utilize all of the hardware and software components shown, or a subset of the components in embodiments. Levels of integration may vary depending on an embodiment. For example, memory 1020 may comprise multiple memories. Furthermore, a computing device 101 may contain multiple instances of a component, such as multiple processors (cores), memories, databases, transmitters, receivers, etc. Computing device 101 may comprise a processor equipped with one or more input/output devices, such as network interfaces, storage interfaces, and the like.

In an embodiment, computing device 101 may be, or be a part of, a mainframe computer that accesses a large amount of data related to a cellular network stored in a database. In alternate embodiment, computing device 101 may be embodied as different type of computing device. In an embodiment, types of computing devices include but are not limited to, controller, laptop, desktop, embedded, server, mainframe and/or super (computer).

Memory 1020 stores dynamic computation node group 110 and plan optimizer 111 that include computer instructions embodied in computer programs. In embodiments, other computer programs such as an operating system having a scheduler, application(s) and a database are stored in memory 1020. In an embodiment, computer programs for storing and retrieving data are stored in memory 1020. In alternate embodiments, a MPP shared nothing RDBMS system having a plurality of storages coupled to a plurality of compute nodes by a network are included in network 1103 that are accessible by computing device 101

In an embodiment, processor 1010 may include one or more types of electronic processors having one or more cores. In an embodiment, processor 1010 is an integrated circuit processor that executes (or reads) computer instructions that may be included in code and/or computer programs stored on a non-transitory memory to provide at least some of the functions described herein. In an embodiment, processor 1010 is a multi-core processor capable of executing multiple threads. In an embodiment, processor 1010 is a digital signal processor, baseband circuit, field programmable gate array, digital logic circuit and/or equivalent.

A thread of execution (thread or hyper thread) is a sequence of computer instructions that can be managed independently in one embodiment. A scheduler, which may be included in an operating system, may also manage a thread. A thread may be a component of a process, and multiple threads can exist within one process, executing concurrently (one starting before others finish) and sharing resources such as memory, while different processes do not share these resources. In an embodiment, the threads of a process share its instructions (executable code) and its context (the values of the process's variables at any particular time).

Memory 1020 may comprise any type of system memory such as static random access memory (SRAM), dynamic random access memory (DRAM), synchronous DRAM (SDRAM), read-only memory (ROM), a combination thereof, or the like. In an embodiment, a memory 1020 may include ROM for use at boot-up, and DRAM for program and data storage for use while executing computer instructions. In embodiments, memory 1020 is non-transitory or non-volatile integrated circuit memory storage. Similarly, storages described herein may be non-transitory or non-volatile integrated circuit memory storage.

Further, memory 1020 may comprise any type of memory storage device configured to store data, store computer programs including instructions, and store other information and to make the data, computer programs, and other information accessible via interconnect 1070. Memory 1020 may comprise, for example, one or more of a solid state drive, hard disk drive, magnetic disk drive, optical disk drive, or the like. Similarly, storages as described herein may be one or more of a solid state drive, hard disk drive, magnetic disk drive, optical disk drive, or the like in embodiments.

Computing device 101 also includes one or more network interfaces 1050, which may comprise wired links, such as an Ethernet cable or the like, and/or wireless links to access network 1003. A network interface 1050 allows computing device 101 to communicate with network 1003. For example, a network interface 1050 may provide control signals to alter or reassign network connections, including signal paths, between a plurality of storages and a plurality of compute nodes in network 1003. Similarly, a network interface 1050 may provide data and control signals to a plurality of storages and a plurality of compute nodes in network 1003 to store, repartition and redistribute data, among other functions.

In an embodiment, network 1003 may include wired or wireless connections, singly or in combination. In an embodiment, network 1003 may include the Internet, a wide area network (WAN) or a local area network (LAN), singly or in combination.

In an embodiment, network 1003 may include a High Speed Packet Access (HSPA) network, or other suitable wireless systems, such as for example Wireless Local Area Network (WLAN) or Wi-Fi (Institute of Electrical and Electronics Engineers' (IEEE) 802.11x). In an embodiment, computing device 101 uses one or more protocols to transfer information or packets, such as Transmission Control Protocol/Internet Protocol (TCP/IP) packets.

In embodiments, computing device 101 includes input/output (I/O) computer instructions as well as hardware components, such as I/O circuits to receive and output information from and to other computing devices and or networks, via network 1003. In an embodiment, an I/O circuit may include at least a transmitter and receiver circuit.

User interface 1060 may include computer instructions as well as hardware components in embodiments. A user interface 1060 may include input devices such as a touchscreen, microphone, camera, keyboard, mouse, pointing device and/or position sensors. Similarly, a user interface 1060 may include output devices, such as a display, vibrator and/or speaker, to output images, characters, vibrations, speech and/or video as an output. A user interface 1060 may also include a natural user interface where a user may speak, touch or gesture to provide input.

FIG. 11 illustrates a software architecture 1100 to form dynamic computation node groups and select an optimal logic plan to respond to a query according to embodiments of the present technology. In embodiments, software components illustrated in software architecture 1100 are stored in memory 1020 of FIG. 10. In embodiments, software components illustrated in FIG. 11 may be embodied as a computer program, object, function, subroutine, method, software instance, script, a code fragment, stored in an electronic file, singly or in combination. In order to clearly describe the present technology, software components shown in FIG. 11 are described as individual software components. In embodiments, the software components illustrated in FIG. 11, singly or in combination, may be stored (in single or distributed computer-readable storage medium(s)) and/or executed by a single or distributed computing device (processor or multi-core processor) architecture. Functions performed by the various software components described herein are exemplary. In other embodiments, software components identified herein may perform more or less functions. In embodiments, software components may be combined or further separated.

In embodiments, software architecture 1100 includes dynamic computation node group 110 and plan optimizer 111. Dynamic computation node group includes repartition 110*a*, assign 110*b* and redistribute 110*c*. Plan optimizer 111 includes redistribution cost 111*a*, cost reduction from parallelism, skew factor 111*c* and plans 111*d*.

Dynamic computation node group 110 is responsible for, among other functions, assigning a plurality of storages storing a data set, such as a table, to a plurality of target compute nodes. In an embodiment, dynamic computation node group 110 causes control signals or commands to be sent to a network to alter network connections or signal paths between particular storages and particular compute nodes. In an embodiment, dynamic computation node group 110 assigns network connections in response to selected optimal logic plan for responding to a query.

Repartition 110*a* is responsible for, among other functions, for repartitioning or partitioning a set of data, such as a table, into partitioned data or hash buckets to be transferred to a targeted plurality or set of compute nodes.

Assign 110*b* is responsible for, among other functions, assigning a plurality of storages that store the set of data to a particular plurality or set of compute nodes. In an embodiment, assign 110*b* causes control signals or commands to be sent to a network to alter network connections or signal paths between particular storages and particular compute nodes.

Redistribute 110*c* is responsible for, among other functions, redistributing or distributing a repartitioned or partitioned set of data from particular storages that have been assigned to particular compute nodes that may have been assigned in assign 110*b* in an embodiment. In embodiments, a redistribute 110*c* may use a redistribute and/or broadcast operation on at least a portion of the data set.

Plan optimizer 111 is responsible for, among other functions, selecting an optimal logic plan from candidate logic plans to respond (or answer) a query. In an embodiment, plan optimizer 111 receives candidate logic plans from plans 111*d*. In an embodiment, plan optimizer 111 selects an optimal logic plan based on the cost of data redistribution and cost reduction from parallelism in an embodiment. In an embodiment, plan optimizer sums the cost of data redistribution and cost reduction from parallelism at each database operation step in the candidate plan to obtain a total estimated cost of each logic plan. The total estimated cost of each logic plan is then compared and the plan with the least total estimated cost is selected as the optimal logic plan. When the estimated total cost of one or more logic plans are within a predetermined tolerance, a logic plan that uses the least amount of compute nodes is selected as the optimal plan in an embodiment.

Cost of data redistribution 111*a* is responsible for, among other functions, obtaining a cost of data redistribution for a data set. In an embodiment, a cost of data redistribution is calculated as illustrated in FIG. 6A-B and described herein.

Cost reduction from parallelism 111*b* is responsible for, among other functions, obtaining a cost reduction from parallelism in computing a data set. In an embodiment, a cost reduction from parallelism is calculated as illustrated in FIG. 6C and described herein.

Skew factor 111*c* is responsible for, among other functions, obtaining a skew factor. In an embodiment, a skew factor is calculated as illustrated in FIG. 6B and described herein. In an embodiment, skew factor 111*c* provides a skew factor to cost of data redistribution 111*a*.

Plans 111*d* is responsible for, among other functions, obtaining a plurality of candidate logic plans to respond to a query. In an embodiment, plans 111*d* parses a query and forms a syntactic query parse tree, such as syntactic query parse tree 200, in obtaining the plurality of candidate logic plans in an embodiment.

Advantages of the present technology may include, but are not limited to, decoupling computation and storage layers in a MPP shared nothing RDBM system that may increase efficiency, flexibility and performance. Other advantages may include selecting an optimal logic plan to retrieve a response (or answer) to a query that may further enhance performance, flexibility and response times in a MMP shared nothing RDBM system.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or computing device), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, a device having one or more processors executing instructions stored in non-transitory memory, a computer-implemented method, and/or a non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or computing device), partly on the user's computer, as a stand-alone software package, partly on the user's computer and partly on a remote computer, or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A massively parallel processing shared nothing relational database management system comprising:
   a plurality of storages assigned to a plurality of compute nodes;
   a non-transitory memory storing instructions; and
   one or more processors in communication with the non-transitory memory, wherein the one or more processors execute the instructions to:
      store a set of data in a first set of storages in the plurality of storage, the first set of storages assigned to a first set of compute nodes in the plurality of compute nodes;
      obtain a plurality of logic plans that include the database operation on the set of data stored in the first set of storages to respond to a query that accesses the set of data;
      determine a cost of redistributing the set of data to at least another compute node for each logic plan in the plurality of logic plans;
      determine a cost reduction from inter-partition parallelism for each logic plan in the plurality of logic plans; and
      select a logic plan from the plurality of logic plans based on the cost of redistributing the set of data and the cost reduction from inter-partition parallelism;
      repartition the set of data by hashing into a repartitioned set of data;
      reassign the first set of storages to a second set of compute nodes in the plurality of compute nodes;
      distribute the repartitioned set of data to the second set of compute nodes; and
      perform a database operation on the repartitioned set of data by the second set of compute nodes using the selected logic plan to provide an answer to the query.

2. The system of claim 1, wherein the repartition the set of data includes forming smaller hash buckets of the set of data by hashing.

3. The system of claim 1, wherein the repartition is omitted when a repartition key is the same key used to partition the set of data.

4. The system of claim 1, wherein the reassign includes form a network connections between the first set of storages and the second set of compute nodes, and wherein the distribute includes distribute the repartitioned set of data to the second set of compute nodes by way of the network connections.

5. The system of claim 4, wherein the first set of storages and the first set of compute nodes form a shared nothing node in the system, and wherein the database operation includes at least one of an inner join, scan and redistribute.

6. The system of claim 5, wherein the first set of storages include at least an integrated circuit memory to store the set of data, and wherein the first set of compute nodes include at least an integrated circuit processor coupled to the integrated circuit memory by a signal path to transfer the set of data.

7. A computer-implemented method for accessing data in a massively parallel processing shared nothing relational database management system, the method comprising:
storing a set of data in a first set of storages in a plurality of storage, the first set of storages assigned to a first set of compute nodes in a plurality of compute nodes;
obtaining a plurality of logic plans that include the database operation on the set of data stored in the first set of storages to respond to a query that access the set of data;
determining a cost of redistributing the set of data stored in the storage assigned to the first set of compute nodes to a second set of compute nodes for each logic plan in the plurality of logic plans;
determining a cost reduction from inter-partition parallelism for each logic plan in the plurality of logic plans;
selecting a logic plan from the plurality of logic plans based on the cost of redistributing the set of data and the cost reduction from inter-partition parallelism;
repartitioning the set of data by hashing into a repartitioned set of data;
reassigning the first set of storages to the second set of compute nodes in the plurality of compute nodes;
distributing the repartitioned set of data to the second set of compute nodes; and
performing a database operation on the repartitioned set of data by the second set of compute nodes using the selected logic plan to provide an answer to the query.

8. The computer-implemented method of claim 7, wherein the logic plan includes at least one database operation on the set of data.

9. The computer-implemented method of claim 8, wherein the at least one database operation on the set of data includes at least one of a join, hash aggregation and redistribution.

10. The computer-implemented method of claim 7, wherein the determining the cost of redistributing the set of data comprises:
calculating a number of tuples to be processed in the set of data;
calculating a width of a tuple in the set of data;
calculating a hashing cost factor for the set of data;
calculating an average data transfer speed through a network coupled between the storage and at least the another compute node;
calculating a degree of inter-partition parallelism with a skew factor; and
calculating the cost of redistributing the set of data in response to at least the number of tuples to be processed, the width of the tuple, the hashing cost factor, the average data transfer speed and the degree of inter-partition parallelism with the skew factor.

11. The computer-implemented method of claim 10, wherein the skew factor represents a data skew associated with the set of data.

12. The computer-implemented method of claim 7, wherein the determining the cost reduction from inter-partition parallelism comprises:
calculating an operator cost of a hash join on the data set;
calculating an operator cost of a hash aggregate on the data set;
calculating a hashing cost factor for the set of data;
calculating a degree of inter-partition parallelism with a skew factor; and
calculating the cost reduction from inter-parallelism in response to the operator cost of the hash join or the operator cost of the hash aggregate and the degree of inter-partition parallelism with the skew factor.

13. The computer-implemented method of claim 12, wherein the skew factor is computed based on a percentage of a most common value in the data set.

14. The computer-implemented method of claim 7, wherein the computer-implemented method is performed at least partially by a massively parallel processing shared nothing relational database management system.

15. A non-transitory computer-readable medium storing computer instructions for accessing data in a massively parallel processing shared nothing relational database management system, that when executed by one or more processors, cause one or more processors to perform the steps of:
store a set of data in a first set of storages in a plurality of storages, the first set of storages assigned to a first set of compute nodes in a plurality of compute nodes;
obtain a plurality of logic plans that include the database operation on the set of data stored in the first set of storages to respond to a query that accesses the set of data;
determine a cost of redistributing the set of data stored in the first set of storages to a second set of compute nodes for each logic plan in the plurality of logic plans;
determine a cost reduction from inter-partition parallelism for each logic plan in the plurality of logic plans;
select a logic plan from the plurality of logic plans based on the cost of redistributing the set of data and the cost reduction from inter-partition parallelism;
repartition the set of data by hashing into a repartitioned set of data;
reassign the first set of storages to the second set of compute nodes;
distribute the repartitioned set of data to the second set of compute nodes; and
perform a database operation on the repartitioned set of data by the second set of compute nodes to provide an answer to the query.

16. The non-transitory computer-readable medium of claim 15, wherein the plurality of storages and plurality of compute nodes are included in a massively parallel processing shared nothing relational database management system.

17. The non-transitory computer-readable medium of claim 15, wherein determine the cost of redistributing the set of data comprises:
calculate a number of tuples to be processed in the set of data;

calculate a width of a tuple in the set of data;
calculate a hashing cost factor for the set of data;
calculate an average data transfer speed through a network coupled between at the first set of storages and the second set of compute nodes;
calculate a degree of inter-partition parallelism with a skew factor; and
calculate the cost of redistributing the set of data in response to at least the number of tuples to be processed, the width of the tuple, the hashing cost factor, the average transfer speed and the degree of inter-partition parallelism with the skew factor.

18. The non-transitory computer-readable medium of claim 17, wherein determine the cost reduction from inter-partition parallelism comprises:
calculate an operator cost of a hash join on the data set;
calculate an operator cost of a hash aggregate on the data set;
calculate a hashing cost factor for the set of data;
calculate a degree of inter-partition parallelism with a skew factor; and
calculate the cost reduction from inter-parallelism in response to the operator cost of the hash join or the operator cost of the hash aggregate and the degree of inter-partition parallelism with the skew factor.

19. The non-transitory computer-readable medium of claim 18, wherein the skew factor is computed based on a percentage of a most common value in the data set.

* * * * *

UNITED STATES PATENT AND TRADEMARK OFFICE
CERTIFICATE OF CORRECTION

PATENT NO. : 10,649,996 B2
APPLICATION NO. : 15/374158
DATED : May 12, 2020
INVENTOR(S) : L. Zhang et al.

It is certified that error appears in the above-identified patent and that said Letters Patent is hereby corrected as shown below:

In the Claims

Column 18, Line 40 (Claim 1), please change "storage" to --storages--
Column 18, Line 52 (Claim 1), please delete "and"
Column 18, Line 65 (Claim 2), please change "the repartition the set" to --the repartition of the set--
Column 19, Line 4 (Claim 4), please change "reassign includes form a network connections" to --reassigning includes forming network connections--
Column 19, Line 7 (Claim 4), please change "distribute includes distribute" to --distributing includes distributing--
Column 19, Line 25 (Claim 7), please change "plurality of storage" to --plurality of storages--
Column 19, Line 29 (Claim 7), please change "access" to --accesses--
Column 20, Line 64 (Claim 17), please change "determine" to --determining--
Column 21, Line 4 (Claim 17), please delete "at"
Column 21, Line 14 (Claim 18), please change "determine" to --determining--

Signed and Sealed this
First Day of September, 2020

Andrei Iancu
*Director of the United States Patent and Trademark Office*